United States Patent [19]

Buchner et al.

[11] 4,330,084
[45] May 18, 1982

[54] METHOD FOR OPERATING A HEATING POWER PLANT AND HEATING POWER PLANT FOR CARRYING OUT THE METHOD

[75] Inventors: Helmut Buchner, Wendlingen; Otto Bernauer, Weinstadt, both of Fed. Rep. of Germany

[73] Assignee: Daimler-Benz Aktiengesellschaft, Stuttgart, Fed. Rep. of Germany

[21] Appl. No.: 8,260

[22] Filed: Feb. 1, 1979

[30] Foreign Application Priority Data

Feb. 18, 1978 [DE] Fed. Rep. of Germany ....... 2807075

[51] Int. Cl.³ ................................................ F24D 1/00
[52] U.S. Cl. ..................................... 237/12.1; 165/51; 165/DIG. 17; 290/2; 60/649; 60/655
[58] Field of Search ..................... 165/51, DIG. 17, 1; 237/12.1; 62/2; 290/2; 60/649, 650, 651, 655, 671, 673, 682, 690, 618, 648

[56] References Cited

U.S. PATENT DOCUMENTS 3,943,719 3/1976 Terry et al. ..................... 60/649 X
4,085,590 4/1978 Powell et al. ..................... 60/673
4,090,361 5/1978 Terry et al. ..................... 60/649
4,150,300 4/1979 Van Winkle ..................... 290/2

Primary Examiner—Albert W. Davis
Assistant Examiner—Margaret A. Focarino
Attorney, Agent, or Firm—Craig & Antonelli

[57] ABSTRACT

A heating power plant and a process for operating the power plant with the power plant containing a thermal power installation for producing mechanical motive energy for driving an energy supply device as well as waste heat which may be utlized for heating purposes in the power plant. The thermal power installation may be shut down or operated at slight partial loads during periods of low energy needs with hydrogen being introduced into a metal hydride storage device which is capable of absorbing hydrogen. At times of higher energy need the thermal power installation is kept in operation under greater load conditions and hydrogen is removed from a metal hydride storage device which is capable of releasing such hydrogen. The release enthalpy required for releasing the hydrogen is provided by waste heat from the thermal power installation or by ambient air.

28 Claims, 1 Drawing Figure

U.S. Patent May 18, 1982 4,330,084
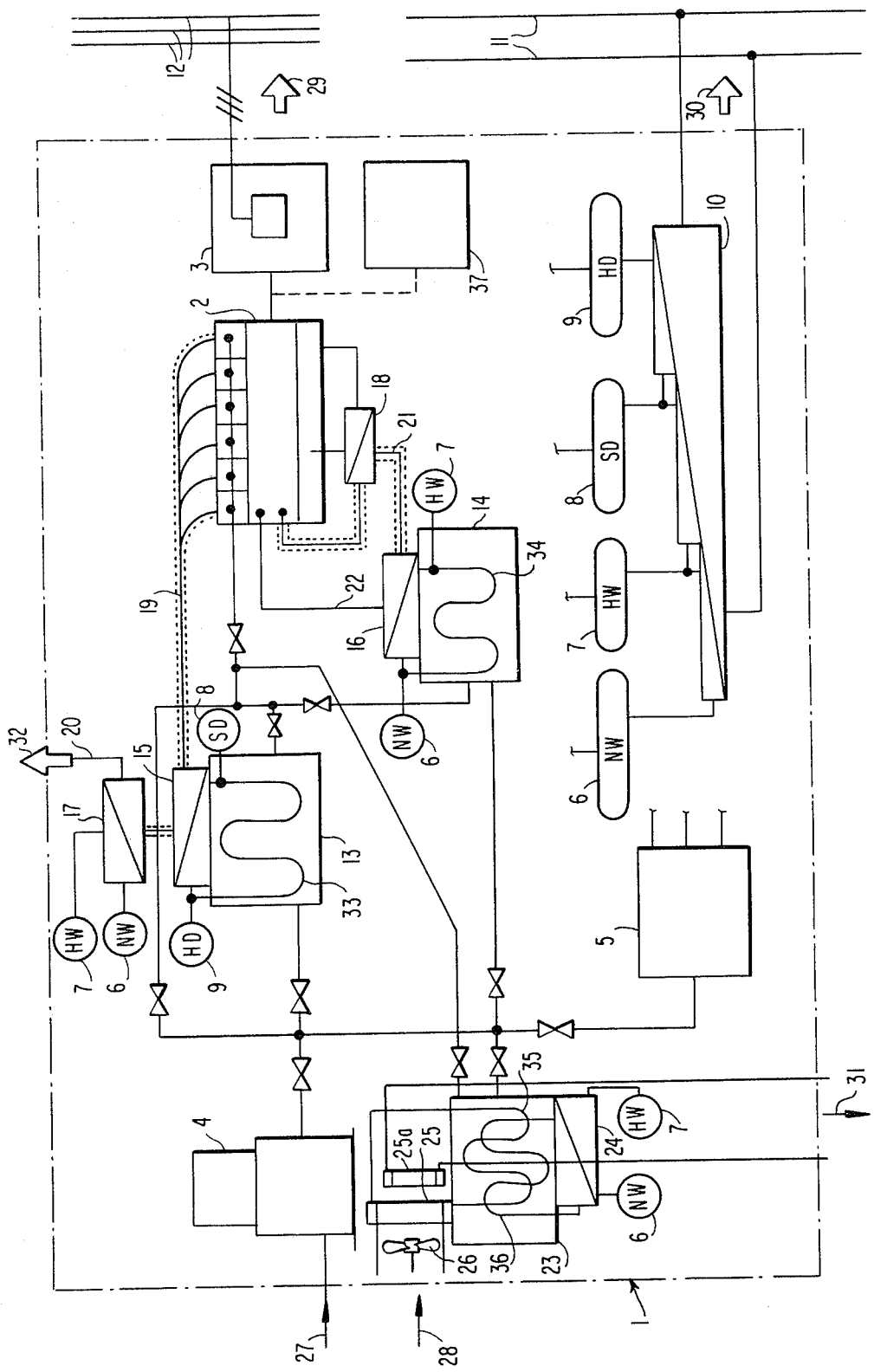

METHOD FOR OPERATING A HEATING POWER PLANT AND HEATING POWER PLANT FOR CARRYING OUT THE METHOD

The present invention relates to a heating power plant and a process for operating the heating power plant.

Heating power plants for containing a thermal power installation, for example, an internal combustion engine, are capable of producing mechanical motive energy as well as waste heat, with the mechanical motive energy being employed for driving a working motor for an energy supply such as, for example, an electric generator, with the waste heat being employed for heating purposes.

In heating power plants with a thermal power installation producing mechanical motive energy as well as waste heat such as, for example, with an internal combustion engine, the engine may be coupled by way of a driving means to a working motor or engine for an energy supply such as an electric generator with the points of the internal combustion engine producing the waste heat being coupled in a heat exchanging connection at least indirectly to heat consumers.

Since the degree of efficiency in generating mechanical energy is quite low in the thermal power engines or thermal power installations such as, for example, gas engines or gas turbine plants as well as steam turbine plants, a high proportion of the input of primary energy results in the form of waste heat. In terms of magnitude, this proportion of waste heat in relation to the input of primary energy amounts to approximately two-thirds.

It has been proposed to utilize the waste heat generated for heating purposes. In stationary heating power plants, the primary purpose of which consists of centrally generating heating energy, there has also been a changeover to installing a thermal power installation in order to use its mechanical motive energy for generating current in its waste heat energy for heating purposes. In this manner, a very high degree of utilization of the input of primary energy can be obtained in total (see "Kommunalwirtschaft" [Municipal Economy] 1976, pages 63 et seq).

Despite the described advantages of high energy utilization in the conversion of primary energy, the above-described possibility of the economical heat supply for communities or rather large individual objects entails a series of disadvantages. More particularly, one disadvantage resides in the fact that the thermal power installation must be operated during the night with at least a certain partial load because of the need for heat also exists at night. However, since the noise control regulations are considerably stricter at night than during daytime hours, certain noise emission limits cannot be maintained except with an unreasonably high expenditure for insulating means when a thermal power installation is operated at night.

Moreover, peak requirements for electrical energy on the one hand, and heating energy on the other hand, occur at different times within a twenty-four hour period. The installation can hardly be operated at its optimal point because of the shift in time of the peak requirements of the two forms of energy. It would be optimal if the proportion of the required electrical energy to the required heating energy corresponded approximately to the proportion of usable mechanical energy to usable waste heat energy, that is, in terms of magnitude, approximately at a ratio of 1 to 2. However, this relation is relatively rare within the course of the day and only exists for relatively short periods of time.

The aim underlying the present invention essentially resides in providing a heating power plant and a process for operating such heating power plant whereby the combined electrical and heating power plant may be optimally operated in view of energy utilization despite different peak requirement times for electricity or heat.

In accordance with advantageous features of the present invention, during periods of low energy, especially at night, the thermal power installation is shut down or operated at a slight partial load. Hydrogen may be introduced into a metal hydride storage means capable of absorbing hydrogen chemically reversably bound therein with the binding enthalpy being released in the process and being utilized for heating purposes. At times of higher energy need, especially during the day, the thermal power installation may be kept in operation under a greater load condition with hydrogen being removed from a metal hydride storage means capable of releasing hydrogen with the release enthalpy required therefor provided by the waste heat from the thermal power installation or by ambient air. Thus, during the periods of low energy need a so-called charging time is provided; whereas at times of higher energy need, a discharge time is provided.

As evident from the above features of the present invention, a method and appartus is proposed wherein a storage of thermal energy is effected at times of relatively slight heat requirement in a release of the stored amount of heat occurring during times of greater heat requirement. The metal hydride storage means proposed for the purpose have a very high specific storage capacity which is, in magnitude, higher than the specific storage capacity of conventional storage systems. Due to the high storage densities capable of being realized, the displacement of production peaks of even higher efficiency units within a daily cycle is readily possible at very reasonable expenses.

Metal hydride storage means have been proposed wherein a press-molded granulated material made of grains of specific metals is involved with the metals having the property of being able to chemically fully reversably bind hydrogen and release the hydrogen. In the binding of hydrogen heat is liberated and vice versa, the release of hydrogen requires thermal energy. The press-molded granulated material must have sufficient cavities for the hydrogen to pass through. Wires or metal shavings can be concomitantly pressed with the press-molded material to aid the heat flow therein for, in a hydrogenated state, the granules are poor heat conductors. However, the concomitantly pressed metal shaving must not be capable of hydrogenation, for example, copper or aluminum would be suitable.

The energy may be stored with purely passive participation of the hydrogen. That is the hydrogen in gaseous form, released when the hydrogen is removed from the metal hydride storage means or when energy is fed in, could be intermediately stored in a container from which the hydrogen could be removed again when hydrogen is filled into the storage means and energy is discharged therefrom.

The above-described energy shifting can also be effected with an act of participation of the hydrogen, in that the hydrogen released from the energy storage means is combusted in the thermal power installation. In this connection, a fuel gas can also readily be employed as a carrier for the primary energy, which fuel gas merely contains hydrogen. The storage-active metal selectively removes only the hydrogen from the gaseous mixture to be introduced into the metal hydride storage means and allows the other components of the gaseous mixture to pass through completely unaffected. During the time in which the storage means are charged with hydrogen (energy discharge) the thermal power installation can be operated with a gaseous mixture depleted of hydrogen as a fuel gas. When hydrogen is removed from the storage means (energy storage), the thermal power installation can be operated either with pure hydrogen or with a hydrogen-enriched gaseous mixture.

Since waste heat from thermal power installations is produced within a wide temperature spectrum, it is expedient to simultaneously use various metal hydride storage means, each of which have different temperature levels. For example, in order to utilize the heat contained in the coolant of the circulatory system of the internal combustion engine, a low-temperature storage means may be employed which is filled with a granulated material of, for example, titaniferous iron, the temperature level of which is between $-20°$ and a $+40°$ C. respectively, according to the level of hydrogen pressure. A high-temperature storage means with granules of nickel magnesium may be employed for utilizing the waste heat contained in the waste or exhaust gas of the internal combustion engine. The temperature level of these granules of nickel magnesium is in the range of between $250°$ and $400°$ C.

During the concomitant combustion of hydrogen in the thermal power installation there is a continual need for hydrogen gas which must be produced from other primary energy carriers such as coal or natural gas by steam reforming, the gasification of coal, or cracking degasification. These conversion processes take place exothermically and the energy obtained in the hydrogen produced is less by 15 to 30% respectively, according to the type of process in hydrogen production with respect to the input of primary energy in hydrogen production. From a standpoint of an energy balance, these conversion losses impair the proposed hydrogen consuming energy shifting process; however, due to the continually optimally possible mode of operation of the power installation, energy shifting also saves energy in comparison to the previously proposed combined electricity-thermal installation so that the conversion losses in hydrogen production are at least compensated.

Also, in order to eliminate the above-noted conversion losses, as viewed within the framework of national economy, it is expedient to utilize the waste heat generated during hydrogen production for heating purposes. In this way, peak demands within the course of a day can be met from thermal storage means of the above-noted type which may be refilled at times of slight heat requirement from the production of hydrogen operating continually with an approximately constant level.

In accordance with the present invention, the thermal power installation is operated with a gaseous fuel gas containing at least hydrogen with the hydrogen being supplied to the metal hydride storage means during a charging period which storage means selectively binds the hydrogen out of the fuel gas. The hydrogen released during the discharge period of the the metal hydride storage means is utilized or concomitantly utilized as a fuel gas to operate the thermal power installation.

In accordance with further features of the present invention, the metal hydride storage means of different temperature levels are used simultaneously, and thus, cover a rather broad temperature spectrum when waste heat is produced by the thermal power installation.

During a discharge time, in accordance with the present invention, the release enthalpy of the metal hydride storage means with a low temperature level (that is, a low temperature storage means) is supplied by ambient air which is, chilled below ambient temperature in the process and which is at least indirectly used to cool rooms or goods below ambient temperature.

In accordance with the present invention, during periods of low energy need, the thermal power installation is shut down or operated at a a smaller partial load and the hydrogen from a low-temperature storage means capable of releasing hydrogen is filled into a high-temperature storage means capable of absorbing hydrogen, wherein the amount of binding enthalpy to be released by the high-temperature storage means at least exceeds the amount of release enthalpy required in the lower temperature storage means utilized for heating purposes to release the hydrogen.

If desired, according to the present invention, a hydrogen production means may be optionally arranged but locally separated from the heating power plant with the hydrogen production means being, as noted above, in the form of steam reforming, gasification of coal, or cracking degasification with the waste heat obtained in the hydrogen production being utilized for heating purposes.

It is also possible in accordance with the present invention to intermediately store the waste heat in a metal hydride storage means and temporarily release the heat to a heat consumer in accordance with particular needs.

In the heating power plant of the present invention, at least one hydrogen tight encapsulated metal hydride storage means capable of being cooled and heated has a gas supply and a delivery means to the storage means. Heat consumer or the points generating waste heat of the power plant can optionally be connected in a heat exchanging manner with the metal hydride storage means being capable of being joined on a gas side, optionally, either with a gas source at least containing hydrogen or with a consumer of hydrogen.

The thermal power installation utilized in the heating power plant, according to the present invention, is designed for operation with gas and is a hydrogen consumer and/or a consumer of gas containing at least hydrogen.

The internal combustion engine utilized in the heating power plant may be a liquid cooled engine with at least one metal hydride storage means with a low-temperature level and one hydride storage means with a high temperature level being provided and with the coolant circulation system of the internal combustion engine being connected in a heat exchanging manner with the low temperature storage means and the stream of waste gas from the internal combustion engine being coupled in a heat exchanging fashion with the high temperature storage means.

One or more low temperature storage means may be provided with at least one of the storage means being capable of being connected in a heat exchange relationship at least indirectly with the ambient air. The low temperature storage means and the high temperature storage means may be mutually coupled on the gas side.

Additionally, according to the present invention, a heat pump may also be connected to the thermal power installation instead of or in addition to an electric generator.

To drive the heat pump, according to the present invention, the mechanical motive energy of the thermal power installation may be utilized so as to obtain thermal energy from ambient heat during periods of slight or no need for electrical energy.

Accordingly, it is an object of the present invention to provide a heating power plant and a process for operating the same which avoids by simple means shortcomings and disadvantages encountered in the prior art. Another object of the present invention resides in providing a heating power plant and a process for operating the same by which displacement of production peaks within a daily cycle is readily possible at reasonable expenses.

A further object of the present invention resides in providing a heating power plant and process for operating the same wherein peak demands within the course of a day can be met from thermal storage means which may be refilled at times of slight heat requirement.

These and other objects, features, and advantages of the present invention will become more apparent from the following description when taken in connection with the accompanying drawing which shows, for the purposes of illustration only, one embodiment in accordance with the present invention, and wherein:

The single FIGURE is a schematic illustration of a combined electric-thermal power plant having an energy storage means facility and an energy shifting possibility in accordance with the present invention.

Referring now to the single drawing, according to this FIGURE, a heating power plant generally designated by the reference numeral 1 is schematically depicted by a broken line and includes as essential components a thermal power installation such as, for example, an internal combustion engine 2, an electric generator 3 mechanically coupled with the internal combustion engine 2, a gas storage means 4, a peak load boiler 5, at least one heat exchanger 10 for a heating network 11, several collectors such as, for example, a low temperature water collector 6, a hot water collector 7, a saturated steam collector 8, and a superheated steam collector 9. The electric generator 3 feeds into, for example, a public electrical network 12. The arrows 29, 30 represent the delivery of electrical energy or thermal energy for heating, respectively. The internal combustion engine 2 functions as a heat producer of the heating power plant 1. About one-third of the primary energy supplied to the internal combustion engine 2 is contained in the waste or exhaust gas removed through a heat insulated conduit 19. Approximately another third of the employed primary energy is contained in the coolant or cooling water circulation system of the internal combustion engine 2 and this third must be continually removed from the coolant in order to maintain a constant temperature level of the internal combustion engine 2. The cooling water circulation system includes a coolant outlet line 22 and a forerunner inlet line 21 with the inlet line 21 being heat insulated to prevent heat losses. The inlet line 21 of the cooling water circulation system leads through an oil heat exchanger 18 of the internal combustion engine in order to also be able to utilize the heat contained in the lubricating oil of the internal combustion engine 2.

The hot waste or exhaust gases of the internal combustion engine 2 are passed through a waste gas heat exchanger 15 which is subjected to a throughflow on the heat absorption side of a medium from the saturated steam collector 8. The heat exchanger 15 has an outlet on the heat absorption side which outlet is connected to the superheated steam collector 9. To utilize the residual heat still contained in the waste or exhaust gas of the internal combustion engine 2 after the gas has passed through the heat exchanger 15, another waste gas residual heat exchanger 17 is provided in which the major portion of the residual heat is removed from the waste gas. The waste gas then enters the outside atmosphere by way of a waste gas flue 20 with the waste gas removal being indicated by the arrow 32. The residual heat exchanger 17 is subjected, on the heat absorption side, to a throughflow of the coolant or water of the internal combustion engine 2. The heat exchanger 17 is connected to the low temperature water collector 6 on the low temperature side and to the hot water collector 7 on the other side.

In a similar fashion, the inlet and outlet lines 21, 22 of the coolant circulation system of the internal combustion engine 2 pass through a heat exchanger 16 where the coolant likewise releases its heat into the water which is in connection on the heat absorption side with the low temperature water collector 6 or the hot water collector 7.

However, the waste heat of the internal combustion engine 2 can at least be indirectly fed into the heating network 11 without a time delay by way of three heat exchangers for the waste or exhaust gas, namely, the heat exchangers 15 and 17, and for the coolant or cooling water, the heat exchanger 16. By an appropriate arrangement of conventional connectors (not shown), the medium circulating through the heat exchanger 15 on the heat absorption side can also be directed through the heat exchanger coil 33.

The heat exchanger coil 33 is arranged in an interior of a high temperature storage means 13. The amount of heat released by the waste or exhaust gas in the heat exchanger 15 may be fully or partially transferred into a metal hydride storage means 13 and stored therein by virtue of the above-noted arrangement. The metal hydride storage means 13 can be joined to the gas storage means 4 on the gas side for filling with hydrogen or the metal hydride storage means may be connected to the internal combustion engine 2, also on the gas absorption side, to remove the hydrogen. The storage means 13 is capable of absorbing waste heat when hydrogen is simultaneously removed from the storage means.

The energy storage densities of the metal hydride of the metal hydride storage means, especially high temperature metal hydrides, are very great with the values being approximately 1.0 through 1.8 kwh/kg of metal hydride.

The amount of heat released from the coolant or cooling water in the heat exchanger 16 can also be entirely or partially absorbed or stored in another metal hydride storage means 14 which operates at a lower temperature level. The heat likewise enters the interior of the storage means 14 by way of a heat exchanger coil 34. The storage densities of low temperature metal hydrides are not quite as high as those of metal hydrides of the high temperature level but the corresponding values, approximately 0.65 to 1.0 kwh/kg. of metal hydride, are still very great in comparison to the storage densities of other systems.

The mode of operation of the above-described heating power plant is as follows:

If the need for electrical energy surpasses the need for heating energy, then the heat exchanger coils 33 and 34 are connected to the heat exchangers 15 or 16 either alone or to a major extent and only a slight or no proportion of waste heat of the internal combustion engine 2 reaches the collectors 6–9. In this way, the waste heat is stored in the hydride storage means 13 or 14 and, at the same time, hydrogen is released from these storage means which hydrogen can be concomitantly combusted as a fuel gas in the internal combustion engine 2.

When the need for heating energy prevails over the need for electrical energy, the internal combustion engine 2 can be returned to a corresponding partial load operation for meeting the requirement for electrical energy or the internal combustion engine 2 can be switched off completely. The need for heat can then be met primarily from the two metal hydride storage means 13 and 14 and from the remaining slight waste heat from the reduced engine operation. For this purpose, a supply of hydrogen into the storage means is necessary with the hydrogen being reversably bound therein simultaneously liberating binding enthalpy. In high temperature storage means consisting of magnesium alloys, this amount of heat is approximately 63 to 80 kj/mol $H_2$. In a low temperature storage means consisting of, for example, titaniferous iron, the corresponding values are, for example, 31 kj/mol $H_2$.

Due to the above-noted storage method and arrangement, the proportion of instantaneously released electrical energy to instantaneously released heating energy can be varied at will within broad limits during the course of a day. Within time periods corresponding to a multiple of temporal storage possibilities of the installed storage means, the proportion of electrical energy to heating energy averaged over the time is determined by the proportions set by the internal combustion engine 2 of usable mechanical energy to usable waste heat energy. Changes in this proportion of the energy types averaged over a rather long period of time, can only be made to a very limited extent.

Heating energy can also be delivered externally without having to consume primary energy by filling hydrogen from one of the two metal hydride storage means 13 and 14 into the other and, more specifically, from the low temperature metal hydride storage means 13 into the high temperature metal hydride storage means 13. For, the binding enthalpy, for example, 63 kj/mol $H_2$, liberated in the high temperature storage means 13, capable of absorbing hydrogen, during the transfer is greater than the release enthalpy needed to release the hydrogen in the low temperature storage means 14, for example, 31 kj/mol $H_2$. The difference in enthalpies can be delivered externally. The release enthalpy necessary in the low temperature storage means can be provided by waste heat from the internal combustion engine 2 out of, for example, the coolant or water circulation system when there is a simultaneous need for electrical energy.

Since, in the last-noted connection, the waste heat from the waste or exhaust gas is not needed in the high temperature storage means 13, on the contrary, the high temperature storage means produces heat itself, the waste heat from the exhaust gas can likewise be immediately delivered externally for heating purposes without intermediate storage when the operation of the internal combustion engine 2 is maintained during the filling from one storage means to the other.

If during the transfer process, no electrical energy should be required, then the internal combustion engine 2 may be switched off. The release enthalpy necessary in the low temperature storage means 14 would then have to be met by the binding enthalpy released in the high temperature storage means 13. The total amount of heating energy which can be externally delivered is then essentially limited to the difference in enthalpies.

For the sake of completion, it should also be noted that the high temperature storage means 13 must be brought from a cold or room temperature state to a specific activating temperature of approximately 250° to 300° C. by an appropriate heat input before hydrogen absorption or hydrogen release can occur with a practically usable reaction velocity. When the high temperature storage means 13 is being filled with hydrogen, the heat input for activation can be stopped as soon as the activating temperature has been reached. Due to high reaction kinetics, the storage means 13 then maintains this temperature itself by the further hydrogen supply and, moreover, in so doing, it is capable of externally delivering thermal energy. It is self evident that when hydrogen is removed from the high temperature storage means 13, the heat input must be maintained even beyond the activating phase. Even at room temperature, the low temperature storage means 14 has sufficiently high reaction kinetics so that they do not require activation.

During the activating phase, the heat can be supplied to the high temperature storage means 13 from the waste heat of the waste or exhaust gas of the internal combustion engine 2. This is particularly recommended when there are no other heat carriers of sufficiently high temperature and an inadequate quantity available in the power plant 1. However, it would also be conceivable to activate the high temperature storage means 13 from the superheated steam collector 9 of the heating power plant 1. In case of insufficient capacity, the superheated steam collector 9 would be in turn continually fed from the waste heat of the exhaust gas of the internal combustion engine 2. In that case, activation would occur indirectly from the waste heat of the internal combustion engine 2.

Besides utilization of the waste heat from the internal combustion engine 2, utilization from the ambient air may also be considered. For this purpose, another low temperature storage means 23 is provided with two heat exchanger coils 35, 36 being introduced into the storage means 23 on the heat absorption side or on the heat release side, respectively. The one heat exchanger coil 35 is connected to an air cooler 25 to which ambient air 28 may be supplied by way of, for example, a fan 26. The other heat exchanger coil 36 is connected to a heat exchanger 24. The binding enthalpy being released during a filling of the storage means 23 with hydrogen is delivered to the hot water collector 7 by way of the heat exchanger 24 and can be utilized for heating purposes.

Another liquid-air heat exchanger 25a may be arranged in the air stream leaving the air heat exchanger 25. By the heat exchanger 25a refrigerating energy can be supplied to an outwardly leading coolant cycle indicated by the outwardly directed arrow 31. The low temperature storage means 23 is capable of being connected on the gas side to the gas storage means 4 for filling hydrogen as well as to the internal combustion engine 2 for removing the hydrogen.

The mode of operation of the additional installation described hereinabove is as follows:

The low temperature storage means 23 functions at such a hydrogen pressure at which the temperature level of the storage means 23 is near the freezing point or below such freezing point. Such a low temperature level can be readily realized with a titaniferous iron storage means and a hydrogen pressure in the range of 1 bar. Due to the low temperature level, the storage means 23 may be kept at the same temperature during a charging period in which the storage means 23 is filled with hydrogen and the binding enthalpy is liberated by utilizing this energy for heating purposes by way of the heat exchanger 24 and the heat exchanger coil 36.

The above-noted operating state is indicated when only slight cold or air conditioning energy is needed, for example, at night. At times of an increased need for refrigeration energy, for instance during the day, hydrogen is removed from the storage means 23. In this connection, release enthalpy must be provided, which the metal of the storage means obtains itself from the intermediate environment. That is, during the removal period, the storage means 23 tends to become very greatly chilled and acts like a source of refrigeration. First this refrigerating energy may be released by way of the heat exchanger coil 35 and the heat exchanger 25 to the ambient air which is cooled to approximately $-6°$ to $+6°$ C. An outwardly leading coolant cycle can be fed with the refrigerating energy of this cold air by way of the heat exchanger 25a. The delivered refrigerating energy illustrated by the arrow 31 can be employed for the purposes of room air conditioning, for generating refrigerating energy in freezer warehouses, or, for example, artificial ice skating rinks. A delivery of refrigerating energy from the storage means 23 would also be conceivable during hydrogen removal without the bypass by way of the ambient air. The outwardly leading cooling circulation could directly follow the cooling coil 35.

The primary energy indicated by the arrow 27 supplied in gaseous form to the heating power plant 1 reaches the power plant 1 from a hydrogen production installation 37 by way of appropriate gas conduits. The waste heat obtained in the hydrogen production may likewise be intermediately stored in the metal hydrides of high storage densities in a fashion similar to that in power plant 1 and the waste heat can be released again from the storage means in correspondence to the need for heating energy. In that way, a constant operation in hydrogen production can be maintained on the one hand but the occurring waste heat is maximally utilized for heating purposes on the other hand. Thus, the advantages of the energy shifting contingent on hydrogen are fully brought out in the combined electric thermal power installation. In this context, the energy balance seen within the framework of national economy, of energy input and energy utilization is optimal.

A proportion of electrical to heating energy of less than 1 to 2, for example, 1 to 5 or even less, can also be obtained in the rather long term framework of several storage cycles by the supplemental installation in the heating power plant of a heat pump 37 including the system components necessary therefor (not shown). Even a changeover to exclusive generation of heating energy can be made. In that manner, the advantages of the heat pump system, namely the utilization of ambient air and obtaining usable heating energy therefrom, can be fully brought into play with a relatively low energy input. The amount of waste heat from the driving means of the heat pump are likewise maximally utilized.

While we have shown and described only one embodiment in accordance with the present invention, it is understood that the same is not limited thereto but is susceptible of numerous changes and modifications as known to one having ordinary skill in the art, and we therefore do not wish to be limited to the details shown and described herein but intend to cover all such modifications as are encompassed by the scope of the appended claims.

We claim:

1. A method of operating a heating power plant containing a thermal power installation producing mechanical motive driving energy as well as waste heat for heating purposes, the method comprising the steps of:
   maintaining the thermal power installation at a predetermined load condition during periods of low energy needs;
   introducing hydrogen into a metal hydride storage means capable of absorbing hydrogen chemically reversably bound therein during periods of low energy needs;
   utilizing the binding enthalpy releasable from the hydride storage means for heating purposes during periods of low energy needs;
   operating the thermal power installation at high load conditions at times of higher energy needs; and
   removing hydrogen from a metal hydride storage means capable of releasing hydrogen by supplying a waste heat from at least ambient air so as to obtain a required release enthalpy for the hydride storage means during periods of higher energy needs.

2. A method of operating a heating power plant containing a thermal power installation producing mechanical motive driving energy as well as waste heat for heating purposes, the method comprising the steps of:
   maintaining the thermal power installation at a predetermined load condition during periods of low energy needs;
   introducing hydrogen into a metal hydride storage means capable of absorbing hydrogen chemically reversably bound therein;
   utilizing the binding enthalpy releasable from the hydride storage means for heating purposes;
   operating the thermal power installation at high load conditions at times of higher energy needs by supplying the thermal power installation with a gaseous fuel containing at least hydrogen; and
   removing hydrogen from a metal hydride storage means capable of releasing hydrogen by supplying a waste heat from at least ambient air so as to obtain a required release enthalpy for the hydride storage means.

3. A method for operating a heating power plant containing a thermal power installation producing mechanical motive driving energy as well as waste for heating purposes, the method comprising the steps of:
   maintaining the thermal power installation at a predetermined load condition during periods of low energy needs;
   introducing hydrogen into a metal hydride storage means capable of absorbing hydrogen chemically reversably bound therein during said period of low energy needs;
   utilizing the binding enthalpy releasable from the hydride storage means for heating purposes during said period of low energy needs;

operating the thermal power installation at high load conditions at times of higher energy needs; and removing hydrogen from a metal hydride storage means capable of releasing hydrogen by supplying a waste heat from at least ambient air so as to obtain a required release enthalpy for the hydride storage means during said high energy need.

4. A method according to one of claims 1, 2, or 3, characterized in that the predetermined load condition is a shut down of the thermal power installation.

5. A method according to one of claims 1, 2, or 3, characterized in that the predetermined load condition is a low load operation of the thermal power installation.

6. A heating power plant which includes a thermal power installation for producing a waste heat and mechanical power for driving an energy supply means, and means for coupling the thermal power installation in a heat exchanging relationship at least indirectly to heat consumers of the power plant, characterized in that at least one hydrogen-tight encapsulated metal hydride storage means capable of being heated and cooled is provided for releasing heat and energy at low energy loads and for absorbing heat energy at high energy loads, gas supply and delivery means are operatively connected to the storage means, means are provided for selectively connecting at least points generating waste heat to the storage means in a heat exchanging manner, and in that the storage means are capable of being connected with a hydrogen consumer.

7. A method of operating a heating power plant containing a thermal power installation producing mechanical motive driving energy as well as waste heat for heating purposes, the method comprising the steps of:

maintaining the thermal power installation at a predetermined load condition during periods of low energy needs;

introducing hydrogen into a metal hydride storage means capable of absorbing hydrogen chemically reversably bound therein during periods of low energy needs;

utilizing the binding enthalpy releasable from the hydride storage means for heating purposes during periods of low energy needs;

operating the thermal power installation at high load conditions at times of higher energy needs; and removing hydrogen from a metal hydride storage means capable of releasing hydrogen by supplying a waste heat from at least the thermal power installation so as to obtain a required release enthalpy for the hydride storage means during periods of higher energy needs.

8. A method of operating a heating power plant containing a thermal power installation producing mechanical motive driving energy as well as waste heat for heating purposes, the method comprising the steps of:

maintaining the thermal power installation at a predetermined load condition during periods of low energy needs;

introducing hydrogen into a metal hydride storage means capable of absorbing hydrogen chemically reversably bound therein;

utilizing the binding enthalpy releasable from the hydride storage means for heating purposes;

operating the thermal power installation at high load conditions at times of higher energy needs by supplying the thermal power installation with a gaseous fuel containing at least hydrogen; and removing hydrogen from a metal hydride storage means capable of releasing hydrogen by supplying a waste heat from at least the thermal power installation so as to obtain a required release enthalpy for the hydride storage means.

9. A method according to claim 8, wherein the step of introducing hydrogen includes supplying a gaseous fuel gas containing at least hydrogen to a metal hydride storage means which is capable of selectively binding the hydrogen out of the fuel gas.

10. A method according to claim 9, further comprising the step of supplying the hydrogen removed from the hydride storage means to the thermal power installation so as to be utilized as a fuel gas to operate the thermal power installation.

11. A method according to one of claims 1, 8, 9, 10 or 2 further comprising the step of simultaneously using metal hydride storage means of different temperature levels so as to cover a broad temperature spectrum when waste heat is produced by the thermal power installation.

12. A method according to claim 11, characterized in that a low temperature metal hydride storage means is provided, further comprising the step of supplying the low temperature metal hydride storage means with ambient air which is chilled by a release enthalpy of the low temperature metal hydride storage means, and at least indirectly utilizing the chilled ambient air for refrigeration purposes.

13. A method according to claim 12, characterized in that the metal hydride storage means into which hydrogen is introduced is a low temperature storage means and the metal hydride storage means capable of releasing hydrogen is a high temperature storage means, further comprising the steps of releasing hydrogen from the last-mentioned low temperature storage means to the high temperature storage means when the thermal power installation is or operated at the predetermined load condition, and utilizing the amount of binding enthalpy released in the high temperature storage means which exceeds the amount of release enthalpy required in the last-mentioned low temperature storage means for heating purposes of the heating power plant.

14. A method according to one of claims 7, 8, 9, 1 or 2, characterized in that a separate hydrogen production means is provided, further comprising the steps of obtaining waste heat from the hydrogen production means, and supplying the waste heat to the power plant for heating purposes.

15. A method according to claim 14, further comprising the steps of intermediately storing the waste heat from the hydrogen production means and releasing the stored waste heat to the power plant in accordance with need.

16. A method according to claim 15, further comprising the step of obtaining thermal energy from ambient air during periods of slight or low energy needs.

17. A heating power plant which includes a thermal power installation for producing waste heat and mechanical motive power for driving an energy supply means, and means for coupling the thermal power installation in a heat exchanging relationship at least indirectly to heat consumers of the power plant, characterized in that at least one hydrogen-tight encapsulated metal hydride storage means capable of being heated and cooled is provided for releasing heat energy at low energy loads and for absorbing heat energy at high energy loads, gas supply and delivery means are operatively connected to the storage means, means are provided for selectively connecting at least one of said heat consumers to the storage means in a heat exchanging manner, and in that the storage means are capable of being connected with at least a gas source at least containing hydrogen.

18. A heating power plant according to claim 17, characterized in that the thermal power installation is constructed for operation with gas and is an hydrogen consumer.

19. A power plant according to claim 17, characterized in that the thermal power installation is constructed for operation with gas and is a consumer of gas containing at least hydrogen.

20. A power plant according to one of claims 17, 18, 19, or 6, characterized in that the thermal power installation is a liquid cooled internal combustion engine, and in that the at least one metal hydride storage means includes a low temperature level metal hydride storage means and at least one a high temperature level metal hydride storage means is provided, and in that means are provided for connecting a cooling circulation system of the internal combustion engine in a heat exchanging manner to the low temperature level metal hydride storage means, and means are provided for coupling the high temperature level metal hydride storage means in a heat exchanging fashion with an exhaust gas means of the internal combustion engine.

21. A method for operating a heating power plant containing a thermal power installation producing mechanical motive driving energy as well as waste heat for heating purposes, the method comprising the steps of:
  maintaining the thermal power installation at a predetermined load condition during periods of low energy needs;
  introducing hydrogen into a metal hydride storage means capable of absorbing hydrogen chemically reversably bound therein during said period of low energy need;
  utilizing the binding enthalpy releasable from the hydride storage means for heating purposes during said period of low energy need;
  operating the thermal power installation at high load conditions at times of higher energy needs; and
  removing hydrogen from a metal hydride storage means capable of releasing hydrogen by supplying a waste heat from at least the thermal power installation so as to obtain a required release enthalpy for the hydride storage means during said higher energy need.

22. A heating power plant which includes a thermal power installation for producing waste heat and mechanical motive power for driving an energy supply means, and means for coupling the thermal power installation in a heat exchanging relationship at least indirectly to heat consumers of the power plant, characterized in that at least one hydrogen-tight encapsulated metal hydride storage means capable of being heated and cooled is provided, gas supply and delivery means are operatively connected to the storage means, means are provided for selectively connecting at least said heat consumers to the storage means in a heat exchanging manner, in that the storage means are capable of being operatively connected with at least a gas source at least containing hydrogen in that the thermal power installation is a liquid cooled internal combustion engine, and in that at least one metal hydride storage means with a low temperature level and at least one metal hydride storage means with a high temperature level is provided, and in that means are provided for connecting a cooling circulation system of the internal combustion engine in a heat exchanging manner to the low temperature level metal hydride storage means, and means are provided for coupling the high temperature level metal hydride storage means in a heat exchanging fashion with an exhaust gas means of the internal combustion engine.

23. A heating power plant according to claim 22, characterized in that the thermal power installation is constructed for operation with gas and is an hydrogen consumer.

24. A heating power plant according to claim 22, characterized in that the thermal power installation is constructed for operation with gas and is a consumer of gas containing at least hydrogen.

25. A power plant according to claim 22, 23 or 24, characterized in that one of the low temperature storage means is capable of being connected in a heat exchanging manner at least indirectly with ambient air.

26. A power plant according to claim 25, characterized in that means are provided for mutually coupling the low temperature level metal hydride storage means and high temperature level metal hydride storage means on a gas side.

27. A power plant according to claim 26, characterized in that a heat pump means is provided, and means are provided for connecting the heat pump means to the thermal power installation.

28. A power plant according to claim 27, characterized in that the energy supply means is constructed as an electric generator means.

* * * * *